H. WEICHSEL & S. T. WEBSTER.
DYNAMO ELECTRIC MACHINE.
APPLICATION FILED JUNE 15, 1912.

1,075,452.

Patented Oct. 14, 1913.

2 SHEETS—SHEET 2.

WITNESSES:
Chas. A. Becker
W. H. Alexander.

INVENTORS
Hans Weichsel
Samuel T. Webster
BY
E. E. Huffman
ATTORNEY

UNITED STATES PATENT OFFICE.

HANS WEICHSEL AND SAMUEL T. WEBSTER, OF ST. LOUIS, MISSOURI, ASSIGNORS TO WAGNER ELECTRIC MANUFACTURING COMPANY, OF ST. LOUIS, MISSOURI, A CORPORATION OF MISSOURI.

DYNAMO-ELECTRIC MACHINE.

1,075,452.  Specification of Letters Patent.  Patented Oct. 14, 1913.

Application filed June 15, 1912.  Serial No. 703,828.

*To all whom it may concern:*

Be it known that we, HANS WEICHSEL, a subject of the Emperor of Germany, and SAMUEL T. WEBSTER, a subject of the King of England, residing at the city of St. Louis, State of Missouri, United States of America, have invented a certain new and useful Dynamo-Electric Machine, of which the following is such a full, clear, and exact description as will enable any one skilled in the art to which it appertains to make and use the same, reference being had to the accompanying drawings, forming part of this specification.

Our invention relates to dynamo electric machines and particularly to such as are adapted to start a gasolene engine when fed from a storage battery and to coöperate with said engine after the latter has been brought up to speed; to charge a storage battery used at starting and also to supply other translating devices with current.

It is our object to simplify the construction of such dynamo electric machines and to render them more efficient both at starting and in normal operation.

The storage batteries carried on motor cars for purposes of lighting and ignition comprise a very small number of cells and, therefore, deliver a very low voltage, usually of the order of 12 volts. It has been found a difficult matter to devise a dynamo electric machine which when operated from such low voltage will develop a sufficiently large torque to start a gasolene engine of any size and which, when driven by said engine as a dynamo, will generate a voltage about equal to that of the battery at a sufficiently low speed. Since the available space for the accommodation of auxiliary devices on a motor car is very limited, and since it is desirable that the weight of the auxiliary apparatus should be kept down as much as possible, it becomes important to devise a dynamo electric machine which will not only be a very efficient converter of energy, but which will occupy as little space as possible. It is, furthermore, necessary to make provision for limiting the output of such a dynamo electric machine when used for charging the storage battery as otherwise the latter would be readily damaged.

The novel machine we have devised satisfies all the conditions which have just been described as desirable, and has other advantages which will appear from the following description.

Figure 1:
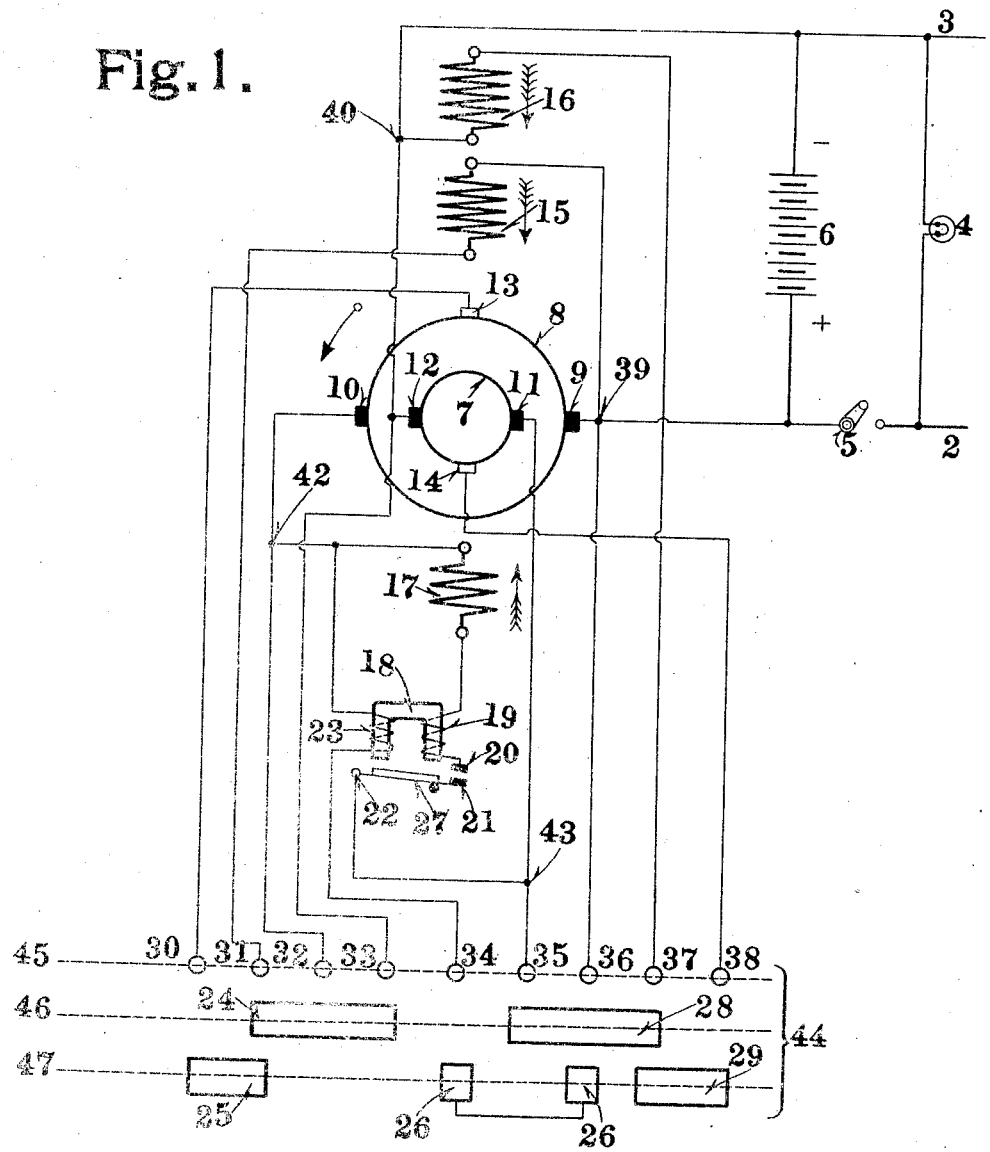
Figure 2:
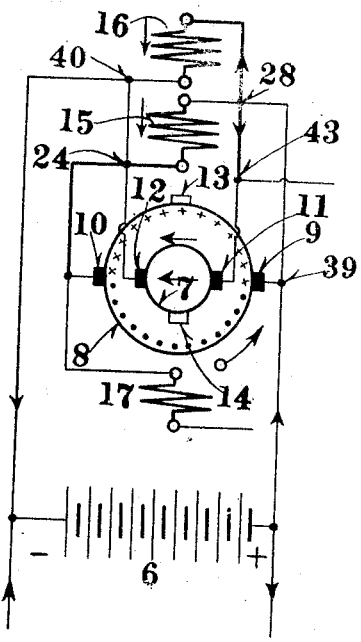

In the accompanying drawings, Figure 1 shows our improved dynamo electric machine, together with the storage battery coöperating with same, and a controller adapted to organize the connections between the machine and the battery both for starting the engine and for charging the battery. Fig. 2 is an explanatory diagram showing the circuits as organized for starting, while Fig. 3 is another explanatory diagram showing the circuits organized for charging the battery.

Referring to Fig. 1, the armature carries two commuted windings 7, 8, each connected to a commutator. Three brushes 9, 10, 13, and 11, 12, 14, coöperate with each of these commutators. The brushes 9, 10, coöperating with the commutator belonging to the commuted winding 8, are working brushes and are placed in the neutral zone of the machine. The brush 13, coöperating with the same commutator is an exciting brush. Similarly, the brushes 11, 12, coöperating with the commutator belonging to the commuted winding 7 are placed in the neutral zone of the machine and are the working brushes of that commutator while the brush 14 is an exciting brush and, like the exciting brush 13, is displaced by 90 electrical degrees with respect to either of the working brushes. The field structure of this machine carries three windings 15, 16 and 17. The first two are shunt windings, the third is a series winding and when in circuit, it is connected to oppose the magnetization produced by the two shunt windings. The storage battery is shown at 6. It can be connected to the consumption circuit 2, 3, containing translating devices such as the lamp 4, by means of the switch 5, and is adapted to be connected to the dynamo electric machine in two different ways by means of the controller 44, which may have three positions: an "off" position 45, a starting position 46, and a running position 47. The gasolene engine is geared to the armature of the dynamo electric machine in any desired manner. Included in the circuit of the decompounding winding 17 is an electro-magnetic switch 18, having an armature 27 pivoted at 22, and carrying a contact 21. The magnet of this switch carries two windings 19 and 23, the former is connected in circuit with the decompounding winding 17 and ends at the contact 20 adapted to coöperate with the contact 21 carried by the movable armature 27, while the winding 23 is adapted to be connected across the brushes 9, 10.

When the controller 44 is in its "off" position 45, then all the circuits of the dynamo electric machine are open and it is, therefore, inoperative. The storage battery 6, however, can at any time be connected to the consumption circuit by means of the switch 5. By moving the controller 44 into the starting position 46, the circuits more clearly shown in Fig. 2 are established by the contact plates 24 and 28 of the controller bridging the finger contacts 31, 32, 33 and 35, 36, 37, respectively. These starting circuits can be traced in Fig. 1 as follows: From the positive terminal of the battery 6, the current flows to the point 39 where it divides into four parallel paths. One of these leads to the working brush 9, through the commuted winding 8 to the working brush 10, and back to the negative pole of the battery by way of the contact 32, the contact plate 24, the contact finger 33 and point 40. Another circuit leads from point 39 through the shunt winding 15 and back to the negative pole of the battery by way of the contact finger 31, the contact plate 24 and the contact finger 33. A third circuit can be traced from point 39 through the contact finger 36, the contact plate 28, the contact finger 35, the working brush 11, the commuted winding 7, the working brush 12 and back to the negative pole of the storage battery by way of point 40. The fourth circuit from point 39 leads by way of the contact finger 36, the contact plate 28, the contact finger 37, the shunt winding 16 and back to the negative pole of the storage battery by way of point 40. It should be noted that in this starting connection, the shunt winding 23 of the automatic switch 18, as well as the series winding 19 thereof, are both on open circuit, and the armature 27 will, therefore, be in its position of rest, in which points 20 and 21 are not in contact. After the gasolene engine has been brought up to a sufficient speed and is being driven by combustion, the controller 44 may be moved into its running position 47 thus establishing the connections more clearly indicated in Fig. 3, but which can be traced as follows in Fig. 1: Starting from the negative pole of the storage battery 6, the main circuit can be traced to point 40, to the working brush 12, through the commuted winding 7, to the working brush 11, to the contact 21 on the armature 27 of the automatic switch 18. At this point the circuit is open as long as said armature is in its position of rest, but should the latter be attracted by the magnet carrying the coils 19 and 23, then contacts 21 and 20 would close the main circuit and the tracing of the latter could be continued as follows: From contact 21 to contact 20, through the series coil 19 of the automatic switch, to the decompounding coil 17 of the dynamo electric machine, to the working brush 10, through the commuted winding 8, to the working brush 9, and back to the positive pole of the storage battery. In addition to this main circuit, three other circuits will be closed and can be traced. One of these circuits connects the exciting brush 14 coöperating with the commuted winding 7 to the working brush 12 coöperating with the same commuted winding by way of the contact finger 3, the contact plate 29, the contact finger 37 and the shunt exciting winding 16. Another of these circuits connects the working brush 9 coöperating with the commuted winding 8 with the exciting brush 13 coöperating with the same commuted winding, by way of the point 39, the shunt winding 15, the contact finger 31, the contact plate 25 and the contact finger 30. The last circuit may be traced from the working brush 9 to point 39, to the finger contact 36, the interconnected contact plates 26, the contact finger 34, through the shunt coil 23 of the automatic switch and back to the commuted winding 8 by way of point 42 and the working brush 10. It will be seen that the shunt coil 23 is connected across the working brushes coöperating with the commuted winding 8. As soon as the combination comprising this commuted winding 8 and the shunt exciting winding 15 becomes self-exciting, an E. M. F. will appear at the working brushes 9, 10, and will rise with increasing speed. The coil 23 is so proportioned that when the said E. M. F. has reached a value for which the total E. M. F. generated by both commuted windings approximately equals that of the storage battery, said shunt coil will attract the movable armature 27 and thus connect the dual armature dynamo electric machine to the storage battery 6, closing the main circuit at the point at which it was found to be interrupted before.

Figure 3:
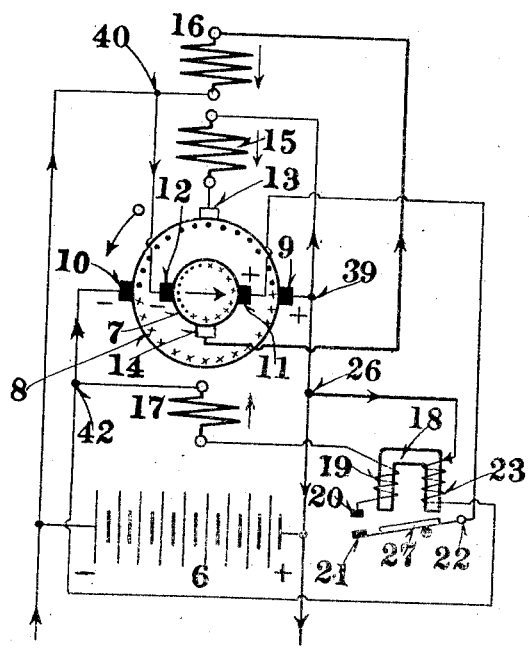

The mode of operation of our improved arrangement may best be ascertained by reference to Figs. 2 and 3. When the controller 44 is placed in the starting position 46 establishing the circuits shown in Fig. 2, then it will be seen that both commuted windings on the armature are connected in parallel to the battery 6, and the two shunt windings 15, 16 are also connected across the full voltage of said battery. Starting from the positive pole of the storage battery, one armature circuit is traced to brush 9, through the commuted winding 8, to brush 10, to point 24, to point 40, and back to the negative pole of the storage battery; while the other armature circuit is traced through point 28, brush 11, commuted winding 7, brush 12, points 24 and 40, and back to the storage battery. The two shunt windings are fed from point 28, the current through the shunt winding 16 returning to the storage battery by way of point 40 and the current through 15 returning to that source by way of points 24 and 40. By connecting the armature windings and the field windings in the manner described, we secure a very strong excitation and a very large armature current at starting, notwithstanding the very low battery voltage at our disposal and the relatively high resistance of the various contacts and particularly of the commutator brushes. At starting, the series winding 17 is not made use of.

After the motor has brought the engine up to a sufficiently high speed, ignition is taking place in said engine, the controller 44 is moved to its running position 47, and establishes the connections more particularly described with reference to Fig. 1, and clearly shown in Fig. 3. These connections differ from the starting connections shown in Fig. 2, in that the two commuted windings 7, 8, are now connected in series with each other instead of in parallel as was the case at starting. Furthermore, the series decompounding winding 17 is included in circuit with these commuted windings and the storage battery and finally the shunt windings 15, 16 are disconnected from the full battery voltage and connected across a portion only of each of the commuted windings 7, 8. While the controller 44, standing in the running position 47, reorganizes the circuits between the storage battery and the dynamo in the manner indicated in Fig. 3, yet it does not close the circuit between the dynamo and the battery leaving that duty to the automatic switch 18. The shunt winding 23 of said switch was on open circuit in the starting position but is connected across the brushes 9, 10 when the running connections are made. The shunt winding 15 in Fig. 3 is connected across the working brush 9 and the exciting brush 13 coöperating with the commuted winding 8, while the shunt winding 16 is connected between the exciting brush 14 and the working brush 12 coöperating with the commuted winding 7. The arrows placed adjacent to the shunt windings 15, 16, and within the circles representing the commuted windings 7, 8, in Figs. 2 and 3, represent the direction of the flux produced by the shunt windings and the direction of the E. M. F. impressed or generated in the commuted windings. Thus in Fig. 2, the exciting flux is directed downward and the E. M. F. impressed on the commuted windings is directed from right to left. In Fig. 3, the exciting flux is again directed downward, while the E. M. F. generated in the armature windings is directed from left to right. The connections between the commuted windings and the shunt exciting windings in Fig. 3 are such that at no load approximately one-half of the E. M. F. generated in the one or the other commuted winding is impressed on the shunt exciting winding coöperating therewith. This is achieved by deriving the exciting E. M. F. from about one-half of the effective armature conductors instead of from all these conductors. To this end, the exciting brushes 13 and 14 are placed approximately midway between the working brushes with which they coöperate. An exciting brush, located as described, may be connected to either of the working brushes coöperating with it. If connected to one of these brushes, the exciting E. M. F. will increase with increasing load. If connected to the other workng brush, said exciting E. M. F. will decrease. In Fig. 3, the exciting brushes 13 and 14 are so connected that the exciting E. M. F. decreases with increasing load.

Assuming a counterclock direction of rotation in Fig. 3 and a downward direction of the remnant magnetism, then, as the speed of the armature increases, the E. M. F. generated therein by rotation in the remnant magnetism will be directed in both commuted windings in the manner indicated by magnetism will be directed in both comcle representing the commuted winding 8, making the brush 9 positive and sending a current from brush 9 through the shunt winding 15 to brush 13 in a direction to assist the remnant magnetism. Similarly, the E. M. F. generated in the commuted winding 7 will send an exciting current from brush 14 through the shunt winding 16 and back to the commuted winding 7 by way of the brush 12. This exciting current will also assist the remnant magnetism and the machine will build up rapidly, also sending a current through the shunt winding 23 of the automatic switch 18. When the E. M. F. generated in the commuted winding 8, connected in series with the commuted winding 7, has reached a value for which the sum of the E. M. F.'s generated in the two commuted windings is about equal to the normal voltage of the storage battery 6, then the flux produced by the shunt winding 23 of the automatic switch reaches a value sufficient to attract the movable armature 27 and to close the charging circuit at points 20 and 21. Should the speed of the dynamo be increased beyond this point, then the E. M. F.'s generated in the commuted windings will tend to increase, causing a charging current to be sent into the battery, as indicated by the arrowheads in Fig. 3. If the dynamo were an ordinary shunt machine then its E. M. F. would rise very rapidly with increasing speed and force an ever increasing current through the storage battery, to the great detriment of the latter. In order to prevent this, the shunt windings 15 and 16 have been connected in the manner already described. As soon as a current flows through either of the commuted windings in the direction of the generated E. M. F., that is, from left to right, then that current sets up through said commuted windings a magnetic flux also directed from left to right. By rotation in this armature reaction flux, E. M. F.'s are set up in both commuted windings, directed as indicated by the dots and crosses placed within the circle representing the commuted winding 7. This auxiliary E. M. F., the magnitude of which depends on the speed and on the armature current, is clearly directed against the exciting E. M. F. responsible for the current through the shunt winding 15 and also clearly opposes the exciting E. M. F. responsible for the current through the shunt winding 16. In this manner, the shunt exciting currents are diminished with increasing speed and load and keep the output of the dynamo electric machine within certain limits irrespective of the speed. We have found that the current curve obtained from such a dynamo, when connected to the storage battery in the manner indicated in Fig. 3, rises very rapidly at first, shows a decided hump, and then diminishes with increasing speed. The maximum value of the current reached in the region of this initial hump in the current curve is excessive and in order to reduce this value to one more nearly suited for charging a storage battery, we dispose on the field magnet of our improved dynamo the demagnetizing series winding 17, the action of which naturally increases with increasing current output. Should the speed of the engine, and consequently of the dynamo, fall below that limit at which the sum of the E. M. F's generated in the commuted windings 7 and 8 becomes less than the E. M. F. existing at the terminals of the storage battery 6, then the current in the charging circuit reverses, the battery tending to drive the dynamo. The series winding 19 located on some part of the automatic switch 18 is so connected that a reversal of the charging current through said winding will cause the latter to oppose the magnetization produced by the shunt winding 23. As soon as the magnetization of this automatic switch has fallen below a certain value, its armature 27 is released and connection between battery and dynamo is broken.

It will be seen that our method of operating our improved dynamo in connection with a gasolene engine and a storage battery consists, broadly, in making use of a dynamo electric machine comprising two commuted windings, two shunt windings and a series demagnetizing winding; in connecting, at starting, the two commuted windings in parallel and the two shunt windings directly across the battery, and in re-organizing the circuits in order to charge the battery by connecting the two commuted windings in series and each of the shunt windings across a part only of the commuted winding; also, in connecting the series demagnetizing winding in opposition to said shunt windings. This method not only enables us to make full use of the windings, both at starting and when running, but permits a very large starting torque to be obtained by subjecting the shunt windings at starting to about four times the voltage impressed on them when charging the battery. Furthermore, these same shunt windings are so connected while charging the battery that they help to limit the current output of the machine and thus safe-guard the storage battery.

Having fully described our invention, what we claim as new and desire to secure by Letters Patent of the United States is:

1. The combination with an accumulator, of a dynamo electric machine having a stationary member provided with a shunt winding, a revolving member provided with two commuted windings, two working brushes for each commuted winding and an exciting brush for one commuted winding, means for connecting the commuted windings and the shunt winding to the accumulator in parallel circuits to operate the machine as a motor, and means for connecting the commuted windings in series and the shunt winding in circuit with a working brush and an exciting brush to operate the machine as a generator.

2. The combination with an accumulator, of a dynamo electric machine having a stationary member provided with two shunt windings, a revolving member provided with two commuted windings, and two working brushes and an exciting brush for each commuted winding, means for connecting the commuted windings and the shunt windings to the accumulator in parallel circuits to operate the machine as a motor, and means for connecting the commuted windings in series and each shunt winding in circuit with a working brush and an exciting brush to operate the machine as a generator.

3. The combination with an accumulator, of a dynamo electric machine having a stationary member provided with two shunt windings and a series winding, a revolving member having two commuted windings, and two working brushes and an exciting brush for each commuted winding, means for connecting the commuted windings and the shunt windings to the accumulator in parallel circuits to operate the machine as a motor, means for connecting the commuted windings in series and for connecting each shunt winding in circuit with an exciting brush and a working brush to run the machine as a generator, and a switch operated by a current generated by the machine for connecting the series winding in circuit with the accumulator.

4. The combination with an accumulator, of a dynamo electric machine having a stationary member provided with two shunt windings and a series winding, all coaxially disposed, a revolving member having two commuted windings, and two working brushes and an exciting brush for each commuted winding, means for connecting the commuted windings and the shunt windings to the accumulator in parallel circuits to operate the machine as a motor, means for connecting the commuted windings in series and for connecting each shunt winding in circuit with an exciting brush and a working brush to run the machine as a generator, and a switch operated by a current generated by the machine for connecting the series winding in opposition to the shunt windings.

5. The combination with an accumulator, of a dynamo electric machine having a stationary member provided with a shunt winding, a revolving member provided with two commuted windings, and two working brushes for each commuted winding and an exciting brush for one commuted winding, the exciting brush being displaced substantially ninety (90) electrical degrees from the corresponding working brushes, means for connecting the commuted windings and the shunt winding to the accumulator in parallel circuits to operate the machine as a motor, and means for connecting the commuted windings in series and the shunt winding in circuit with a working brush and an exciting brush to operate the machine as a generator.

6. The combination with an accumulator, of a dynamo electric machine having a stationary member provided with two shunt windings, a revolving member provided with two commuted windings, and two working brushes and an exciting brush for each commuted winding, each exciting brush being displaced substantially ninety (90) electrical degrees from the corresponding working brushes, means for connecting the commuted windings and the shunt windings to the accumulator in parallel circuits to operate the machine as a motor, and means for connecting the commuted windings in series and each shunt winding in circuit with a working brush and an exciting brush to operate the machine as a generator.

In testimony whereof, we have hereunto set our hands and affixed our seals in the presence of the two subscribing witnesses.

HANS WEICHSEL. [L. S.]
SAMUEL T. WEBSTER. [L. S.]

Witnesses:
VAL A. LYNN,
EMILY W. HEUERMAN.